United States Patent
Park

(10) Patent No.: US 8,580,359 B2
(45) Date of Patent: Nov. 12, 2013

(54) BOTTOM CHASSIS, METHOD OF FABRICATING THE SAME, AND LIQUID CRYSTAL DISPLAY INCLUDING THE SAME

(75) Inventor: Sang-Joon Park, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 176 days.

(21) Appl. No.: 13/172,684

(22) Filed: Jun. 29, 2011

(65) Prior Publication Data

US 2012/0121825 A1    May 17, 2012

(30) Foreign Application Priority Data

Nov. 16, 2010  (KR) .................. 10-2010-0113931

(51) Int. Cl.
*G02F 1/1333* (2006.01)
(52) U.S. Cl.
USPC ........................................... 428/1.62; 349/58
(58) Field of Classification Search
USPC ............... 420/529–535, 537–548, 550–553; 428/1.62; 349/122, 58
See application file for complete search history.

(56) References Cited

U.S. PATENT DOCUMENTS

| | | | |
|---|---|---|---|
| 4,897,124 A * | 1/1990 | Matsuo et al. | 148/551 |
| 7,189,294 B2 * | 3/2007 | Kimura et al. | 148/692 |
| 8,253,880 B2 * | 8/2012 | Park et al. | 349/58 |
| 2005/0000604 A1 * | 1/2005 | Kawahara et al. | 148/440 |
| 2008/0079865 A1 * | 4/2008 | Kang et al. | 349/61 |
| 2009/0053099 A1 * | 2/2009 | Kajihara et al. | 420/535 |
| 2009/0159160 A1 * | 6/2009 | Platek et al. | 148/551 |
| 2012/0055591 A1 * | 3/2012 | Kamat et al. | 148/551 |

FOREIGN PATENT DOCUMENTS

| | | |
|---|---|---|
| JP | 2007-009262 A | 1/2007 |
| JP | 2008-248297 A | 10/2008 |
| KR | 1020060042962 A | 5/2006 |

* cited by examiner

*Primary Examiner* — Sophie Hon
(74) *Attorney, Agent, or Firm* — Innovation Counsel LLP

(57) ABSTRACT

Provided are a bottom chassis, a method of fabricating the same, and a liquid crystal display (LCD) including the same. The bottom chassis is fabricated using an aluminum alloy plate including, by weight, 0.5 to 1.5% manganese, 0.8 to 1.5% magnesium, 0.01 to 0.03% titanium, less than 0.02% molybdenum, and 96% or more aluminum.

3 Claims, 3 Drawing Sheets

BOTTOM CHASSIS, METHOD OF FABRICATING THE SAME, AND LIQUID CRYSTAL DISPLAY INCLUDING THE SAME

This application claims priority from Korean Patent Application No. 10-2010-0113931 filed on Nov. 16, 2010 in the Korean Intellectual Property Office, the disclosure of which is incorporated herein by reference in its entirety.

BACKGROUND OF THE INVENTION

1. Field of the Invention

The present invention relates to a bottom chassis, a method of fabricating the same, and a liquid crystal display (LCD) including the same, and more particularly, to a bottom chassis fabricated using an aluminum alloy plate that can ensure superior mechanical and thermal properties, a method of fabricating the bottom chassis, and an LCD including the bottom chassis.

2. Description of the Related Art

Liquid crystal displays (LCDs) are one of the most widely used types of flat panel displays (FPDs). LCDs are low in power consumption, lightweight and slim, and have high resolution. Due to these advantages, LCDs are being used as display devices for many apparatuses.

An LCD includes a liquid crystal panel which consists of two display substrates and a liquid crystal layer interposed between the two display substrates to display an image. The LCD also includes a backlight unit which emits light to the liquid crystal panel, and a bottom chassis which is disposed under the liquid crystal panel and the backlight unit to house them. The bottom chassis not only provides a housing space, but also dissipates heat generated from a light source, serves as the ground, and blocks electromagnetic waves.

The recent trend toward lighter and slimmer LCDs is increasing the need for the development of an alloy material that can make a bottom chassis thinner and satisfy mechanical and thermal properties required of the bottom chassis.

SUMMARY OF THE INVENTION

A bottom chassis fabricated using an aluminum alloy plate that can ensure superior mechanical and thermal properties, a method of fabricating the bottom chassis, and a liquid crystal display (LCD) including the bottom chassis are provided.

According to one aspect, there is provided a bottom chassis fabricated using an aluminum alloy plate including, by weight, 0.5 to 1.5% manganese, 0.8 to 1.5% magnesium, 0.01 to 0.03% titanium, less than 0.02% molybdenum, and 96% or more aluminum.

According to another aspect, there is provided a bottom chassis fabricated using an aluminum alloy plate having a thickness of 0.6 to 1.2 mm, a yield strength of 110 to 120 MPa, a tensile strength of 185 to 205 MPa, an elongation of 18 to 22%, and a heat transfer coefficient of 160 to 180.

According to another aspect, there is provided a method of fabricating a bottom chassis. The method includes: fabricating an aluminum alloy plate by preparing an aluminum alloy material, rolling the aluminum alloy material at a reduction ratio of 50% or more, and annealing the rolled aluminum alloy material for at least 13 hour; and fabricating the bottom chassis by processing the aluminum alloy plate.

According to another aspect, there is provided an LCD including: a liquid crystal panel displaying an image; a backlight unit providing light to the liquid crystal panel; and a bottom chassis housing the liquid crystal panel and the backlight unit, wherein the bottom chassis is fabricated using an aluminum alloy plate including, by weight, 0.5 to 1.5% manganese, 0.8 to 1.5% magnesium, 0.01 to 0.03% titanium, less than 0.02% molybdenum, and 96% or more aluminum.

BRIEF DESCRIPTION OF THE DRAWINGS

The above and other aspects and features of the present disclosure will become more apparent by describing in detail exemplary embodiments with reference to the attached drawings, in which.

DETAILED DESCRIPTION OF THE INVENTION

Figure 1:
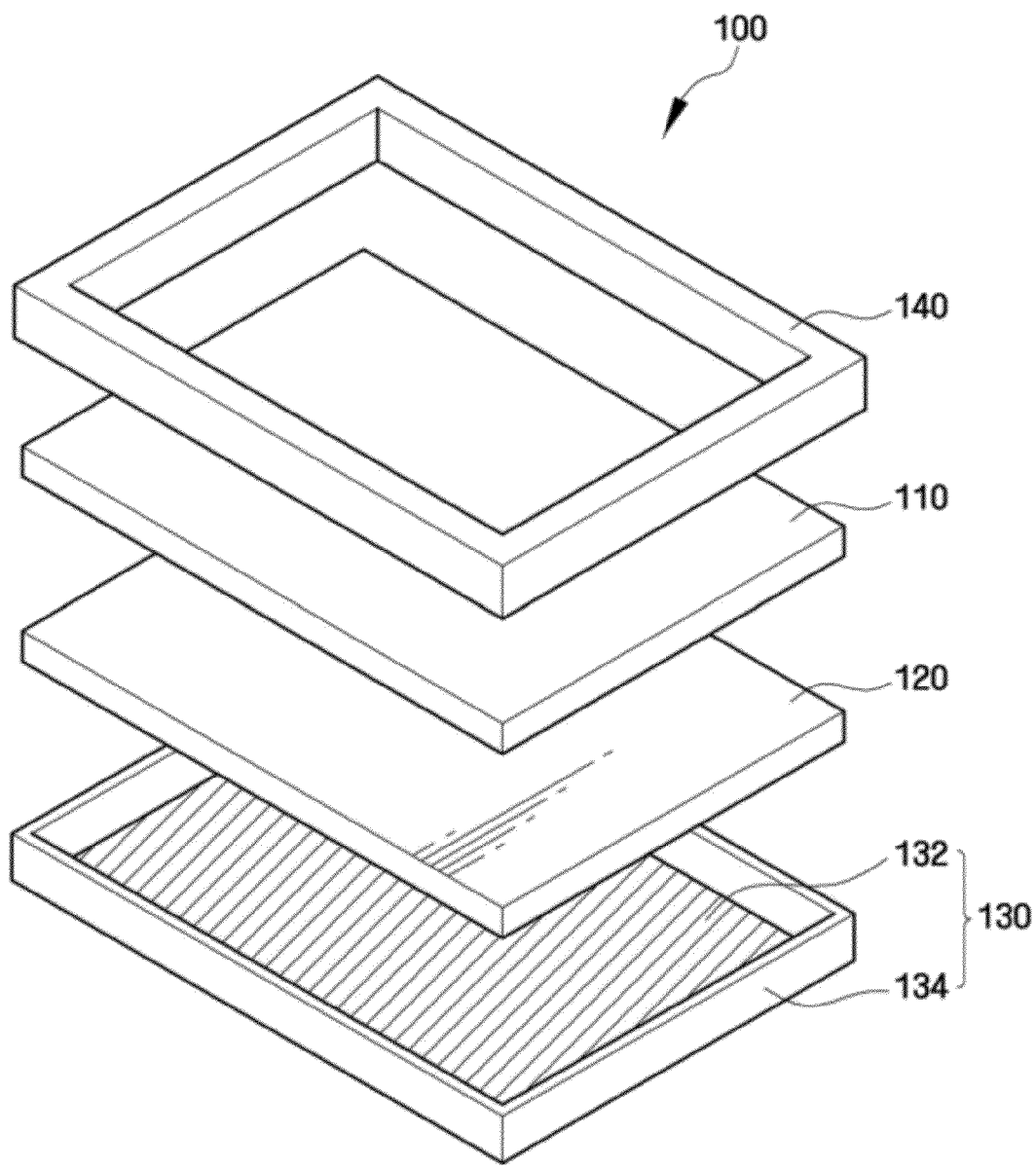
FIG. 1 is a schematic exploded perspective view of a liquid crystal display (LCD) according to an exemplary embodiment.

Advantages and features of the present disclosure and methods of accomplishing the same may be understood more readily by reference to the following detailed description of exemplary embodiments and the accompanying drawings. The present invention may, however, be embodied in many different forms and should not be construed as being limited to the embodiments set forth herein. In the drawings, sizes and relative sizes of layers and regions may be exaggerated for clarity.

It will be understood that when an element or layer is referred to as being "on" another element or layer, the element or layer can be directly on another element or layer, or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments are described herein with reference to plan and cross-sectional illustrations that are schematic illustrations of idealized embodiments. As such, variations from the shapes of the illustrations as a result, for example, of manufacturing techniques and/or tolerances, are to be expected. Thus, embodiments of the invention should not be construed as limited to the particular shapes of regions illustrated herein, but are to include deviations in shapes that result, for example, from manufacturing. Thus, the regions illustrated in the figures are schematic in nature and their shapes are not intended to illustrate the actual shape of a region of a device and are not intended to limit the scope of the invention.

Hereinafter, exemplary embodiments will be described with reference to the attached drawings.

FIG. 1 is a schematic exploded perspective view of a liquid crystal display (LCD) 100 according to an exemplary embodiment.

Referring to FIG. 1, the LCD 100 includes a liquid crystal panel 110, a backlight unit 120, a bottom chassis 130, and a top chassis 140.

The liquid crystal panel 110 displays an image. Although not shown in the drawings, the liquid crystal panel 110 has a structure in which a liquid crystal layer is interposed between two display substrates. Thin-film transistors (TFTs), each controlling liquid crystals and a pixel, which is a minimum unit of an image, are formed on one of the two display substrates. In addition, a color filter forming an image is formed on the other one of the display substrates. That is, the other one of the display substrates is a glass substrate coated with red, green and blue pixels.

The backlight unit 120 provides light to the liquid crystal panel 110 from behind the liquid crystal panel 110. Although not shown in the drawing, the backlight unit 120 includes a light source, a reflective plate, an optical plate such as a light guide plate (LGP) or a diffusion plate, and other optical sheets.

The bottom chassis 130 is disposed under the liquid crystal panel 110 and the backlight unit 120 to house them. To provide a housing space for the other components of the display device, the bottom chassis 130 includes a bottom portion 132 and a side portion 134. The bottom portion 132 of the bottom chassis 130 faces the liquid crystal panel 110 and the backlight unit 120, and the side portion 134 extends vertically from the bottom portion 132 toward the liquid crystal panel 110 and consists of four surfaces.

The top chassis 140 is frame-shaped and is coupled to the bottom chassis 130 so as to define an effective display region of the liquid crystal panel 110.

The bottom chassis 130 may be fabricated by processing a plate made of an alloy (hereinafter, referred to as an 'alloy plate').

When forming the bottom chassis 130, an embossed structure (not shown in FIG. 1) or a deep drawn structure (not shown in FIG. 1) may be formed in various shapes on the bottom portion 132 of the bottom chassis 130. The embossed structure or the deep drawn structure may be provided to couple the LCD 100 to an external device. For example, the embossed structure may service as a coupler that couples the LCD 100 to various substrates or audio sets. In addition, the deep drawn structure may serve as a passage through which a connecting wire for driving the light source of the backlight unit 120 passes. The deep drawn structure may increase the torsional strength of the bottom chassis 130. To accomplish these objectives, the embossed structure or the deep drawn structure may have various shapes. For example, the bottom portion 132 of the bottom chassis 130 may be shaped as shown in a picture of FIG. 2.

Figure 2:
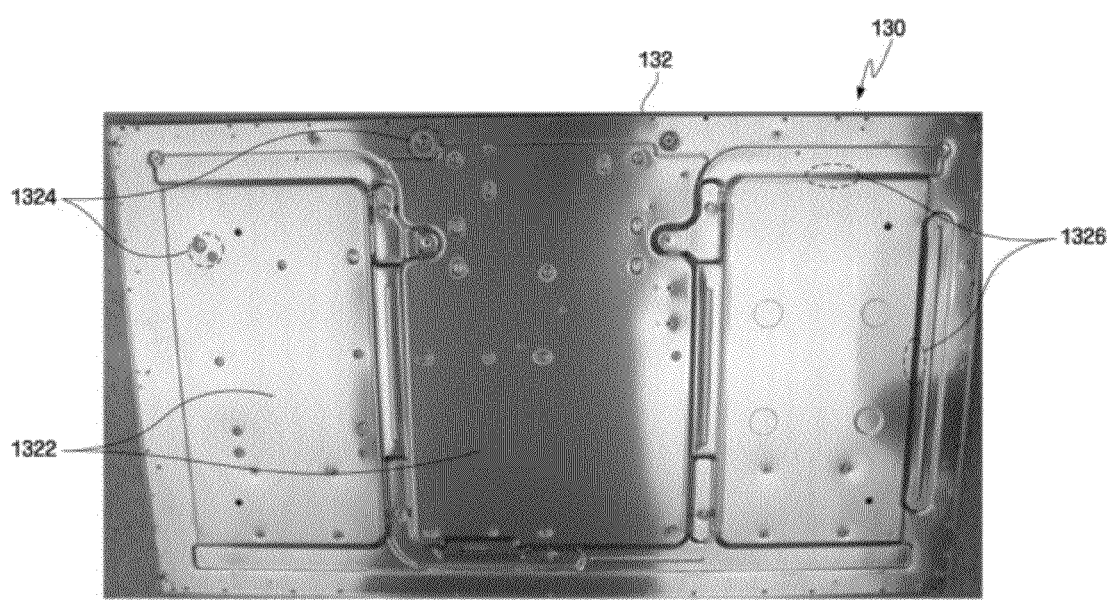
FIG. 2 is a view showing a bottom portion of a bottom chassis according to an exemplary embodiment.

FIG. 2 is a view showing the bottom portion 132 of the bottom chassis 130 according to an exemplary embodiment.

Referring to FIG. 2, the bottom portion 132 of the bottom chassis 130 includes a first surface 1322 on which an optical plate such as an LGP is mounted. An embossed structure 1324 may be formed on the bottom portion 132. The embossed structure 1324 may protrude from the first surface 1322 toward a second surface which is opposite the first surface 1322, or may protrude from the second surface toward the first surface 1322. In addition, a deep drawn structure 1326 may be formed on the bottom portion 132. The deep drawn structure 1326 may be formed on a flat surface and is elongated while also protruding from the first surface 1322 toward the second surface which is opposite the first surface 1322, or protruding from the second surface toward the first surface 1322.

The shape of the bottom portion 132 of the bottom chassis 130 is not limited to the exemplary shape shown in FIG. 2. The bottom portion 132 of the bottom chassis 130 may have various shapes as long as it can house the backlight unit 120 and couple the LCD 100 to a necessary external device.

The above-described bottom chassis 130 satisfies the following requirements.

First, to make the LCD 100 lighter and slimmer, an alloy plate that forms the bottom chassis 130 should be thin. When the alloy plate that forms the bottom chassis 130 is thin, the LCD 100 can be made lighter and slimmer, and costs can be saved due to a reduction in material use.

Despite a reduction in its thickness, the alloy plate that forms the bottom chassis 130 should be able to satisfy required mechanical properties such as the required yield strength, tensile strength, and elongation.

Furthermore, the alloy plate that forms the bottom chassis 130 should satisfy required thermal properties such as the required heat transfer coefficient, so that heat generated from the light source of the backlight unit 120 can be easily dissipated via the bottom chassis 130.

The appropriate thickness, yield strength, tensile strength, elongation, and heat transfer coefficient ranges for an alloy plate suitable for use in fabricating the bottom chassis 130 are provided herein. An alloy plate which can meet these suggested ranges, and a method of fabricating the alloy plate, are also provided.

An alloy plate that forms the bottom chassis 130 may have the following thickness, yield strength, tensile strength, elongation, and heat transfer coefficient.

The alloy plate that forms that bottom chassis 130 may have a thickness range of 0.6 to 1.2 mm. If possible, the alloy plate that forms the bottom chassis 130 has a thickness of 1 mm or less. An alloy plate that is less than 1 mm thick can make the LCD 100 lighter and slimmer and reduce costs.

The yield strength of the alloy plate that forms the bottom chassis 130 may range from 110 to 120 MPa. For example, the alloy plate that forms the bottom chassis 130 may have a yield strength of approximately 115 MPa. In the bottom chassis 130 as shown in FIG. 2, whether an optical plate such as an LGP can be successfully mounted on, for example, the first surface 1322, is closely related to yield strength of the alloy plate used to form bottom chassis 130. The yield strength is the point at which plastic deformation begins to occur. A yield strength lower than a required level causes the first surface 1322 of the bottom chassis 130 to deform plastically, thus making it difficult for an optical plate to be mounted on the surface 1322. Consequently, this degrades the quality stability of the LCD 100. For this reason, the yield strength of the alloy plate that forms the bottom chassis 130 may have a value in a range of 110 to 120 MPa as described above.

The tensile strength of the alloy plate that forms the bottom chassis 130 may be in a range of 185 to 205 MPa. For example, the alloy plate that forms the bottom chassis 130 may have a tensile strength of approximately 195 MPa. Whether the deep drawn structure 1326 can be formed on the bottom chassis 130 as shown in FIG. 2 to perform adequately is closely related to tensile strength of the alloy plate used to form bottom chassis 130. A tensile strength lower than a required level causes the deep drawn structure 1326 of the bottom chassis 130 to be distorted by heat, thus degrading the quality stability of the LCD 100. For this reason, the tensile strength of the alloy plate that forms the bottom chassis 130 may have a value in a range of 185 to 205 MPa as described above.

The elongation of the alloy plate that forms the bottom chassis 130 may range from 18 to 22%. For example, the alloy plate that forms the bottom chassis 130 may have an elongation of approximately 22%. Whether the embossed structure 1324 can be formed on the bottom chassis 130 as shown in FIG. 2 and perform adequately is closely related to elongation. An elongation that fails to meet a required level leads to low formability, which, in turn, makes it difficult to form the embossed structure 1324 of the bottom chassis 130. For this reason, the elongation of the alloy plate that forms the bottom chassis 130 may have a value in a range of 18 to 22% as described above.

The heat transfer coefficient of the alloy plate that forms the bottom chassis 130 may be in a range of 160 to 180. For example, the alloy plate that forms the bottom chassis 130 may have a heat transfer coefficient of 170. When the heat transfer coefficient of the alloy plate is in the above range, heat generated from a light source can be easily dissipated.

To have the above-described thickness, yield strength, tensile strength, elongation and heat transfer coefficient, the alloy plate that forms the bottom chassis 130 may be made of an aluminum alloy having the following composition. That is, the bottom chassis 130 according to an exemplary embodiment is fabricated using an aluminum (Al) alloy plate having the following composition.

An alloy plate that forms the bottom chassis 130 according to an exemplary embodiment may include, by weight, 0.5 to 1.5% manganese (Mn), 0.8 to 1.5% magnesium (Mg), 0.01 to 0.03% titanium (Ti), and 96% or more Al. The Al alloy plate may further include less than 0.02% molybdenum (Mo) by weight. Mn may enhance heat transfer efficient, Mg may increase strength, and Ti may increase elongation. Mo may additionally be added to further increase strength. An example of such an alloy plate may be an Al alloy plate including, by weight, 0.1 to 0.3% silicon (Si), 0.4 to 0.6% iron (Fe), 0.1 to 0.2% copper (Cu), 0.5 to 1.5% Mn, 0.8 to 1.5% Mg, less than 0.03% chrome (Cr), less than 0.05% zinc (Zn), less than 0.02% Mo, 0.01 to 0.03% Ti, and the balance of Al.

Hereinafter, a description will be given of a method of fabricating the Al alloy plate. First, an Al alloy material including, by weight, 0.5 to 1.5% Mn, 0.8 to 1.5% Mg, 0.01 to 0.03% Ti, and 96% or more Al is prepared. For example, an Al alloy plate including, by weight, 0.1 to 0.3% Si, 0.4 to 0.6% Fe, 0.1 to 0.2% Cu, 0.5 to 1.5% Mn, 0.8 to 1.5% Mg, less than 0.03% Cr, less than 0.05% Zn, less than 0.02% Mo, 0.01 to 0.03% Ti, and the balance of Al is prepared. The Al alloy material may have a thickness that is greater than the desired thickness of the bottom chassis 130, for example, the Al alloy material may have a thickness of 2.85 mm by rolling.

To obtain an Al alloy plate having a desired thickness, the Al alloy material is rolled. That is, a rolling process is performed such that an Al alloy plate has a thickness of 0.6 to 1.2 mm, if possible, approximately 1 mm. To satisfy this requirement, a cold rolling process may be performed at a reduction ratio of 50% or more. The reduction ratio is a ratio of the thickness of an Al alloy material before being rolled to that of the Al alloy plate after being rolled. Because the Al alloy material has a thickness of approximately 2.85 mm as described above, the reduction ratio should be 50% or more in order to achieve a desired Al alloy plate thickness. Generally, a rolling reduction ratio is 30 to 40%. However, when the thickness of an alloy material is 3 mm or less as in the current exemplary embodiment, the rolling reduction ratio can be increased to 50% or more by adding a load in the rolling process. The rolling reduction ratio increased to 50% or more leads to an increase in the yield strength and/or tensile strength, thereby satisfying yield strength and/or tensile strength properties required by the bottom chassis 130.

Next, the rolled Al alloy material is annealed. Annealing is a process of cooling metal or glass after heat treatment. The annealing process may be performed for 13 hours or more. More specifically, in the current exemplary embodiment, the rolled Al alloy material is heat-treated for approximately 7 hours or more at a temperature of 400 to 420° C. After heat treatment, furnace cooling may be performed for 5 hours or more. That is, after the rolled Al alloy material is heat-treated, it is left in an unheated furnace for 5 hours or more to naturally cool the rolled Al alloy material. If the annealing process is performed as described above, elongation properties required by the bottom chassis can be satisfied while the strength corresponding to a high reduction ratio, e.g., a reduction ratio of 50% or more, is maintained. Consequently, this can result in an increase in formability.

As a result of sequentially performing the above processes, an Al alloy plate used to fabricate the bottom chassis 130 can be manufactured.

When the manufactured Al alloy plate fails to have target yield strength, tension leveling may additionally be performed after the annealing process, such that the Al alloy plate has the target yield strength. However, the tension leveling process is optional. Tension leveling is well known to those of ordinary skill in the art as a process to level shape-fault of a strip of material after a cold rolling.

The Al alloy plate described above may have a thickness of 0.6 to 1.2 mm, a yield strength of 110 to 120 MPa, a tensile strength of 185 to 205 MPa, an elongation of 18 to 22%, and a heat transfer coefficient of 160 to 80, as supported by an experimental example below.

Experimental Example

An Al alloy plate of the current experimental example was fabricated to include, by weight, 0.203% Si, 0.502% Fe, 0.151% Cu, 1.0% Mn, 1.208% Mg, 0.019% Cr, 0.039% Zn, less than 0.001% Mo, 0.02% Ti and the balance of Al and to have a thickness of approximately 1 mm.

The Al alloy plate of the current experimental example was fabricated as follows. An Al alloy material including, by weight, 0.203% Si, 0.502% Fe, 0.151% Cu, 1.0% Mn, 1.208% Mg, 0.019% Cr, 0.039% Zn, less than 0.001% Mo, 0.02% Ti, and the balance of Al was produced.

Then, the Al alloy material was cold-rolled to have a thickness of approximately 1 mm. Here, the cold rolling of the Al alloy material was performed at a reduction ratio of 50% or more. A reduction ratio is a ratio of the thickness of a material after a rolling to the thickness of the material before the rolling.

The Al alloy material was annealed for approximately 13 hours. More specifically, the Al alloy material was heat-treated for 7 hours at a temperature of 410° C., and then furnace cooling was performed for 5 hours. After the furnace cooling, tension leveling was performed such that the yield strength of the Al alloy plate is in a range of 110 to 120 MPa. Tension leveling is well known to those of ordinary skill in the art as a process to level shape-fault of a strip of material after a cold rolling.

As a result, the Al alloy plate of the current experimental example was fabricated and its mechanical properties were measured. The results are shown in FIG. 3.

Figure 3:
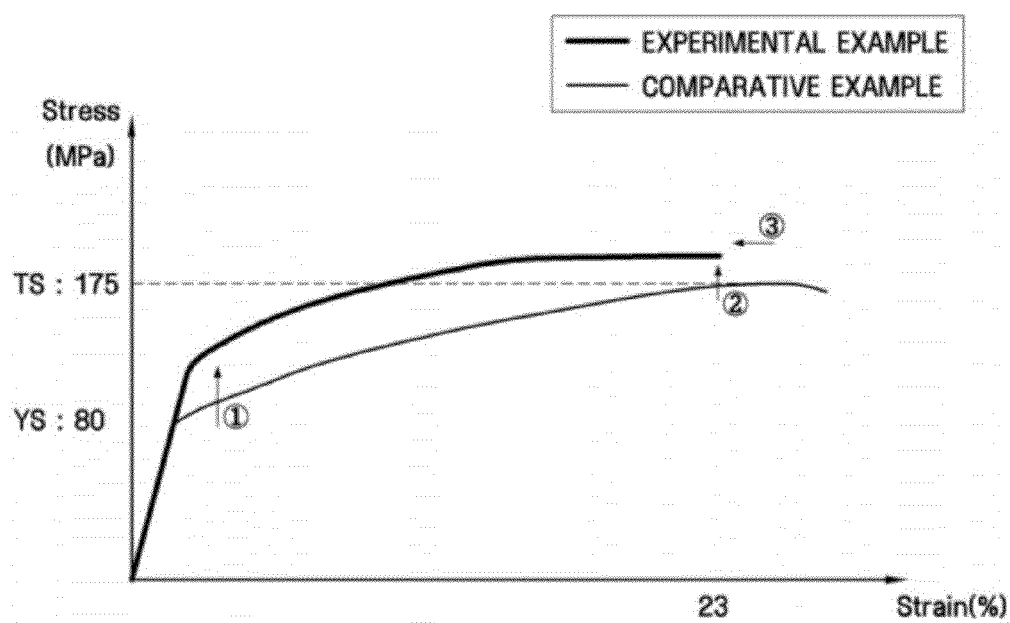
FIG. 3 is a graph illustrating mechanical properties of an aluminum alloy plate fabricated according to an exemplary embodiment.

FIG. 3 is a graph illustrating mechanical properties of an Al alloy plate fabricated according to an exemplary embodiment, the Experimental Example, compared to those of an Al alloy plate fabricated according to conventional art, the Comparative Example. Specifically, a stress-strain curve of the Experimental Example alloy plate for bottom chassis and a stress-strain curve of the Comparative Example are illustrated for comparison purposes.

As apparent from FIG. 3, the stress-strain curve (see Experimental Example) of the Al alloy plate fabricated according to the above experimental example is higher than the stress-strain curve (see Comparative Example) of the alloy plate for bottom chassis which was fabricated according to the conventional art.

Therefore, the Al alloy plate of the Experimental Example exhibits an approximately 30% higher yield strength YS (see ①), an approximately 17% higher tensile strength TS (see ②), and an approximately 3 to 4% lower elongation (see ③) than the conventional alloy plate for bottom chassis.

Specifically, the Al alloy plate of the Experimental Example was measured to be 1 mm in thickness, 115 MPa in yield strength, 195 MPa in tensile strength, and approximately 20% in elongation. In addition, the measured heat transfer coefficient of the Al alloy plate of the Experimental Example is approximately 170.

Accordingly, it can be understood that an Al alloy plate according to an exemplary embodiment has a thickness, yield strength, tensile strength, elongation, and heat transfer coefficient suitable for fabrication of the bottom chassis 130.

As described above, in an Al alloy plate and a method of fabricating the same according to an exemplary embodiment, all properties required of a bottom chassis, including thickness, mechanical properties and thermal properties, can be satisfied. Ultimately, this contributes to the quality improvement of an LCD.

While the present disclosure has been particularly shown and described with reference to exemplary embodiments thereof, it will be understood by those of ordinary skill in the art that various changes in form and detail may be made therein without departing from the spirit and scope of the present invention as defined by the disclosure including the following claims. The exemplary embodiments should be considered in a descriptive sense only and not for purposes of limitation.

What is claimed is:

1. A liquid crystal display (LCD) comprising:
a liquid crystal panel displaying an image;
a backlight unit providing light to the liquid crystal panel; and
a bottom chassis housing the liquid crystal panel and the backlight unit,
wherein the bottom chassis is fabricated using an aluminum alloy plate comprising, by weight, 0.5 to 1.5% manganese, 0.8 to 1.5% magnesium, 0.01 to 0.03% titanium, less than 0.02% molybdenum, and 96% or more aluminum.

2. The LCD of claim 1, wherein the aluminum alloy plate further comprises, by weight, 0.1 to 0.3% silicon, 0.4 to 0.6% iron, 0.1 to 0.2% copper, less than 0.03% chrome, and less than 0.05% zinc.

3. The LCD of claim 1, wherein the aluminum alloy plate has a thickness of 0.6 to 1.2 mm, a yield strength of 110 to 120 MPa, a tensile strength of 185 to 205 MPa, an elongation of 18 to 22%, and a heat transfer coefficient of 160 to 180.

* * * * *